United States Patent [19]

Jones

[11] Patent Number: 4,768,331
[45] Date of Patent: Sep. 6, 1988

[54] LAKE RAKE

[76] Inventor: Donald J. Jones, 10 Gertrude Pl., Wappinger Falls, N.Y. 12590

[21] Appl. No.: 94,253

[22] Filed: Sep. 4, 1987

[51] Int. Cl.⁴ .......................... A01D 7/00; A01D 44/00
[52] U.S. Cl. ............................................. 56/8; 56/400
[58] Field of Search .................................. 56/8, 9, 400

[56] References Cited

U.S. PATENT DOCUMENTS

| | | | |
|---|---|---|---|
| 121,227 | 11/1871 | Baker | 56/8 |
| 1,392,900 | 10/1921 | Ambrose | 56/8 |
| 2,050,133 | 8/1936 | Smith | 56/8 |
| 2,770,056 | 11/1956 | Hawkins | 56/400 |

FOREIGN PATENT DOCUMENTS 1212352  2/1986  U.S.S.R. .................................. 56/9

*Primary Examiner*—Robert P. Swiatek
*Assistant Examiner*—J. Marie Britt

[57] ABSTRACT

Aquatic plants and their entangled roots can be removed from a lake or other body of water by pulling a lake rake out onto the lake, then pulling the lake rake, with a load of plants and their roots, back in to a central collection site on shore. Multi-purpose teeth of this rake are shaped and positioned to glide across the surface of a lake on the outbound trip, to dig below rooted plants on the inbound trip, and to pass over small crevices or uneven joints on a ramp, truck or trailer at the collection site. Embodiments of the invention may be constructed in a variety of sizes from standard size materials that are commercially available, such as aluminum, steel or plastics.

1 Claim, 2 Drawing Sheets

LAKE RAKE

BACKGROUND OF THE INVENTION

Lake management often includes the control of aquatic plants that have become a nuisance. Currently available weed harvesters cut the weeds, allowing regrowth to occur within a few weeks. If the weeds and their roots were removed from a lake, the time before regrowth could be extended to several years.

SUMMARY OF THE INVENTION

The main purpose of the invention is to provide a rake for removing rooted plants and their entangled roots from the bottom of a lake or other body of water when a rake is pulled in toward shore.

An equally important purpose is to provide a rake for removing floating plants from on or below the surface of a lake when the rake is pulled in toward shore.

A third purpose is to provide a rake with teeth that pass over small crevices or uneven joints when the rake is pulled up a ramp to bring a load of collected matter onto a truck or trailer.

Another purpose is to provide a rake that is self unloading when it is pulled out away from the collection site.

An additional purpose is to provide a rake that glides on the surface of a lake, passing over floating plants when the rake is pulled out onto the lake.

Another purpose is to provide for replacing the teeth of the rake with more suitably designed teeth when circumstances change, such as changing seasons of the year, collecting at a different lake that contains different types of plants, or cleaning a sandy beach without removing the sand along with the plants.

This invention comprises a triangular shaped frame that provides support for an axle that in turn provides support for a set of multi-purpose teeth and their separators.

Among the different sets of teeth that can be used, some sets of rake teeth have a leading edge that is a flat surface to serve as a sled or ski when the rake is pulled out away from shore.

The triangular shaped frame is covered to collect floating plants while, at the same time, the rake teeth collect both floating and rooted plants. The flat rake tooth surface that forms the leading edge during the rake's outbound trip provides a digging action for each tooth when the rake is pulled in toward shore. The collecting edge of the leftmost and rightmost rake teeth are sharpened to cut large roots into removable lengths.

The bottom edge of each rake tooth is elongated to provide a surface that passes over small obstructions that may be encountered when the rake is pulled up onto a ramp, truck or trailer.

A set of rake teeth and their separators can be replaced by removing their supporting axle from between its frame supports and re-installing the axle with a different set of teeth and separators.

Rake teeth can be constructed from standard size tees, beams, rectangular tubing or plates that are commercially available in materials such as aluminum, steel or plastic.

BRIEF DESCRIPTION OF THE DRAWINGS

The accompanying drawings illustrate each feature of the invention wherein the same characters refer to the same or similar parts throughout the different views, in which.

DETAILED DESCRIPTION

Figure 1:
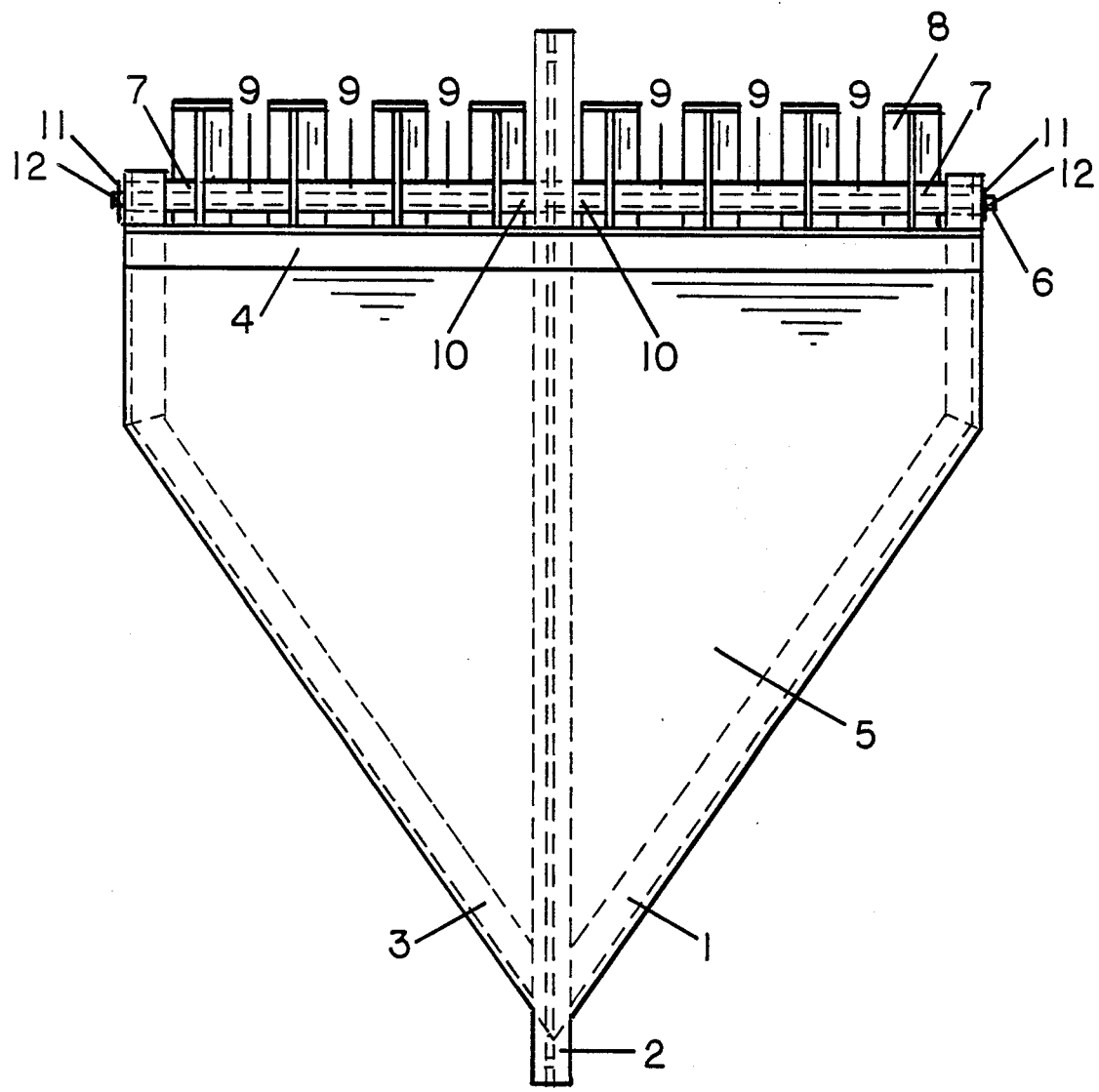
FIG. 1 is a top view of a lake rake embodying this invention.

Referring now to the accompanying drawings, FIG. 1 shows the top view of a lake rake. The lake rake frame comprises the right side support 1, center support 2, and left side support 3 that are secured to each other and to a tooth backstop 4. A cover 5 extends from the edges of each side support 1 and 3 to the tooth backstop 4.

An axle 6 passes through the right side, center, and left side supports 1, 2 and 3. Multi-purpose rake teeth 8 and teeth separators 7, 9 and 10 are pivotably mounted on the axle. In addition to keeping the teeth 8 evenly spaced and away from the frame supports 1, 2 and 3, the separators 7, 9 and 10 are made with an oversized diameter to provide vertical alignment of the rake teeth 8. A washer 11 and cotter pin 12 are positioned at each end of the axle 6.

Figure 2:
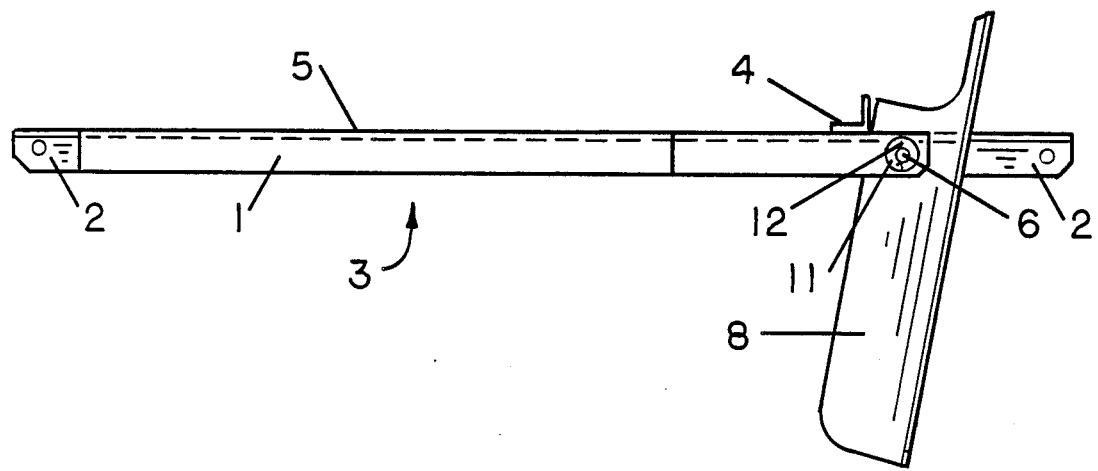
FIG. 2 is a right side view of the rake.

FIG. 2 shows the right side view of the rake. Rake teeth 8 are pivotably mounted on the axle 6. A rake tooth backstop 4 is located above and on the collecting side, to the left in this view, of the axle 6 to limit the outbound and inbound movement of the rake teeth 8. A rope or chain attached to the outbound end of the center support 2 is used to pull the rake out onto a lake, to the right in this view. While the rake is being pulled out, the clockwise movement of the rake teeth 8 is limited by the lower horizontal surface of the tooth backstop 4. The rake teeth 8 extend above the center support 2 where the pulling force is being applied. Rake teeth 8 centrally pivot on the axle 6. A flat surface on the outboard edge of the rake teeth 8 serves as a sled or ski that enables the rake to glide across the surface of the lake and above floating plants or other objects.

A rope or chain attached to the inbound end of the center support 2 is used to pull the rake back in toward shore, to the left in this view. While the rake is being pulled in, counterclockwise movement of the rake teeth 8 is limited by the vertical surface of the tooth backstop 4. The flat surface on the outbound, now trailing, edge of the rake teeth 8 causes the rake teeth to dig down below roots and other debris that are encountered on the bottom of a lake.

Collecting surfaces of the rake teeth 8 are perpendicular to the flat skiing or digging surface. The collecting edge of the collecting surfaces is sometimes sharpened as a knife. The bottom edge of the collecting surfaces is elongated to pass over small crevices or uneven joints when the rake is pulled up a ramp to bring a load of collected matter onto a truck or trailer.

Figure 3:
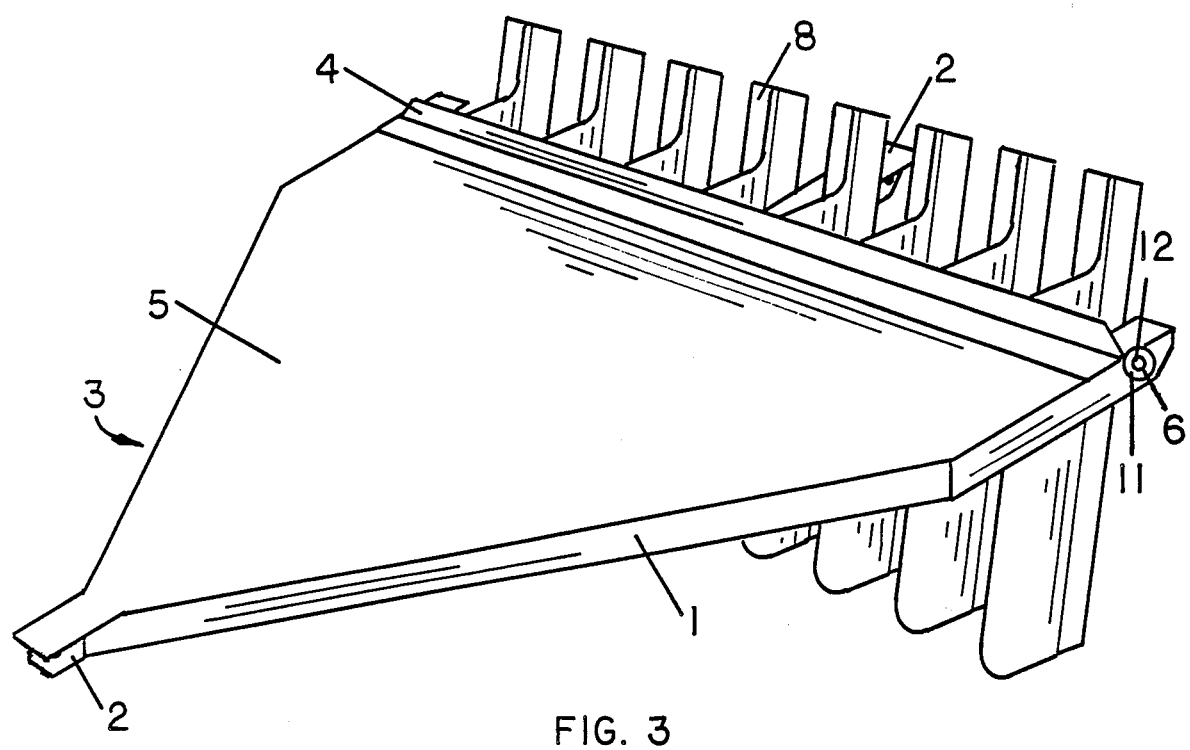
FIG. 3 is a perspective view illustrating the relationships between the frame and teeth of the lake rake.

FIG. 3 is a perspective view that illustrates the relationships between the frame and teeth of the lake rake. When ropes or chains are attached to both ends of the center support 2, the rake can be pulled out onto the lake or pulled back in toward shore. On the outbound trip, the rake teeth 8 rotate clockwise on the axle 6 until stopped by the lower horizontal surface of the tooth backstop 4.

On the inbound trip, the rake teeth rotate counterclockwise on the axle 6 until stopped by the vertical surface of the tooth backstop 4. The weight of the rake, the angle between the rake teeth 8 and the rake frame, and the shape of the rake teeth 8 cause the rake teeth 8 to move down toward the bottom of the lake. Objects that are encountered either by the rake teeth 8 or by the top cover 5 will be collected by the rake and brought to shore. The collecting edge of the leftmost and rightmost rake teeth 8 are sharpened as a knife to cut large roots into removable lengths. When the rake is fully loaded, additional matter will float above the rake, float to the left or right of the rake, or be passed over by the rake.

Figure 4:
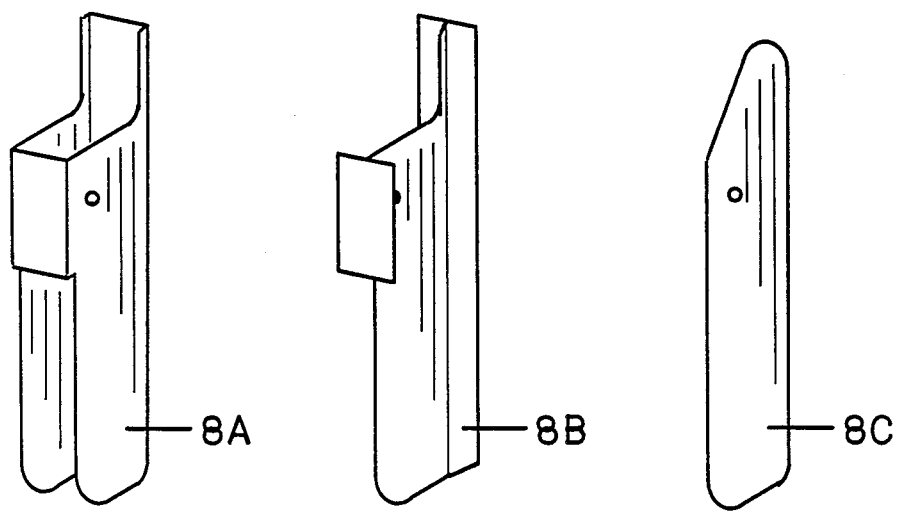
FIG. 4 is a perspective view of alternate rake teeth.

FIG. 4 shows a perspective view of three alternate rake teeth. A rake tooth constructed from rectangular tubing 8A provides maximum durability and collecting strength that is effective for raking a lake during winter months.

A rake tooth constructed from a beam 8B provides maximum durability and sledding action to pass over floating plants during the summer growing season.

A rake tooth constructed from a single plate 8C provides minimum disturbance of an area being raked, and is appropriate for cleaning a sandy beach.

This invention expands the basic capabilities of a rake to overcome the problems of collecting floating objects from a body of water. As the rake glides across the surface of a lake on the outward trip, it also glides above any floating plants or other objects.

Embodiments of the invention may also be used in other environments such as a rain soaked farmer's field that cannot support the weight of other harvesting equipment.

The foregoing specification and descriptions are intended to illustrate the invention and shall not be construed as limiting the ways in which this invention may be practiced.

I claim:

1. A rake for the control of aquatic plants comprising: a frame having a normally operational outbound and an inbound end, said frame having one side and another opposite side, an axle, means mounting said axle on said sides, at least two rake teeth, each having a longitudinal length and mounted for pivotable movement on said axle, a stop mounted on said frame for limiting outbound and inbound movement of said teeth, whereby said teeth are able to maintain a substantially vertical alignment for digging up roots from the bottom of a lake or other body of water, each of said teeth consisting of an outbound, flat substantially vertical plate and at least one substantially perpendicular plate extending inbound of said flat plate.

* * * * *